April 18, 1933.　　　　J. J. GILBERT　　　　1,903,992
SUBMARINE CABLE LOADING COIL
Filed Aug. 23, 1930
FIG. 1
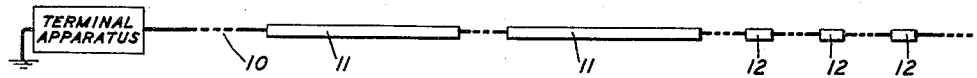
FIG. 2
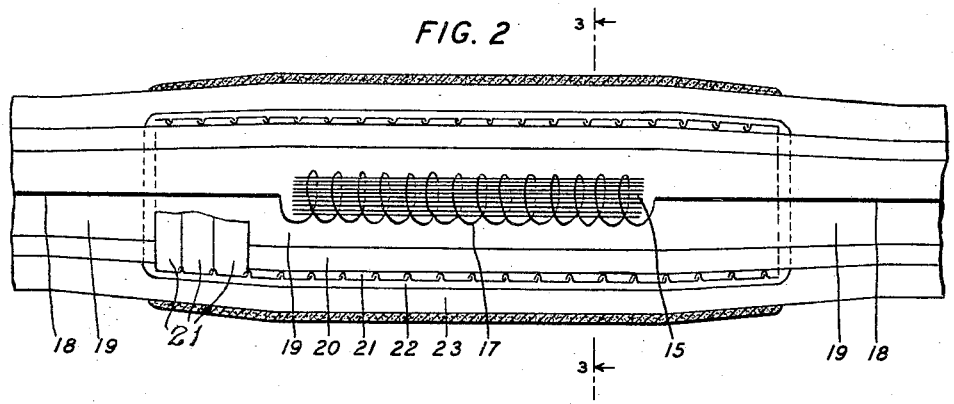
FIG. 3　　　　FIG. 4
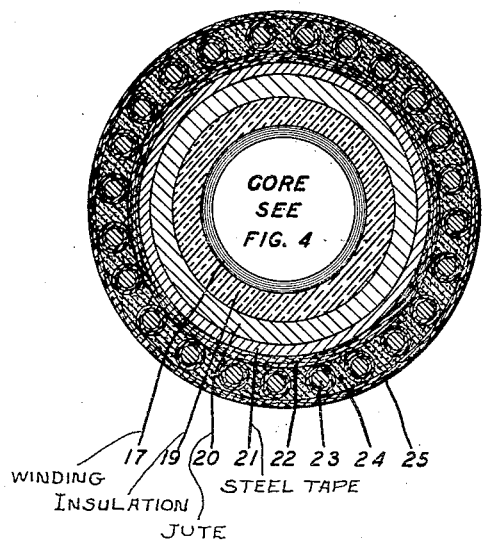
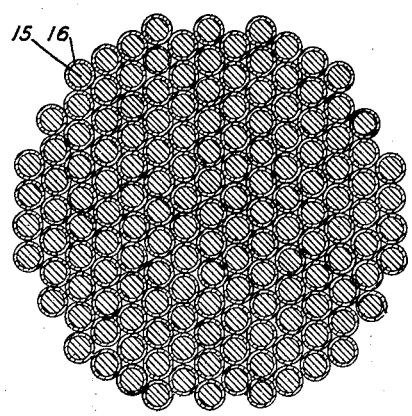
INVENTOR
J. J. GILBERT
BY
*J. W. Schmied*
ATTORNEY Patented Apr. 18, 1933

1,903,992

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

SUBMARINE CABLE LOADING COIL

Application filed August 23, 1930, Serial No. 477,243, and in Great Britain October 25, 1929.

This invention relates to loaded submarine cables and particularly to such cables in which the loading is concentrated in a plurality of loading coils distributed along the length of the cable.

An object of the invention is to reduce hysteresis and eddy current losses in coil loaded submarine signaling cables.

Another object of the invention is to provide a submarine cable loading coil whose magnetic and electric properties will be unaffected by the mechanical strains and hydrostatic pressure encountered during the laying and operation thereof in oceanic depths.

A further object of the invention is to provide a method of inserting loading coils into deep sea cables which will neither mechanically weaken the structure of the cable nor introduce special difficulties in the laying of the cable.

A still further object of the invention is to reduce energy losses caused in the armor wires of long lump loaded submarine cables by the transmission of signaling currents.

A feature of the present invention resides in the provision of a flexible protective envelope for loading coil of deep sea signaling cables.

In deep sea signaling cables the distribution of electric current is not uniform throughout the length of the cable. The current at the transmitting end is in general many times greater than the current at the receiving end and in the middle of the cable. Where the current is small and the magnetic material used for loading has a fairly low value of hysteresis coefficient, the apparent resistance introduced into the loading coils owing to hysteresis in the magnetic material is usually small as compared with the direct current resistance of the conductor and the apparent resistance introduced owing to eddy currents. The hysteresis loss is proportional to the current strength and consequently at those parts in the cable where the current is or may be great, the apparent resistance introduced into the loading coils by hysteresis loss in the magnetic material may be large. Furthermore in coil loaded cables, the coil is usually surrounded by armor wires and the field of the coil will give rise to energy losses in the armor which increase the attenuation of the cable.

According to the present invention, these disadvantages of coil loaded cables are overcome or at least greatly minimized in the following manner:

The loading coils at the terminal portions of the cable are designed to minimize hysteresis loss and ohmic or pure resistance loss while those in the middle portions of the cable are designed so as to minimize resistive and eddy current losses. If $l$ is the length of the coil, $n$ the number of turns in the coil and $D$ and $d$ the diameters of the coil overall and the magnetic core respectively, $\mu$, $\rho$, $\lambda$ are respectively the effective permeability, resistivity and hysteresis coefficient (equal to $$\frac{1}{\mu}\frac{d\mu}{dB},$$

where $B$ is the flux density) of the magnetic material, $t$ the diameter of the wires of which the core is formed, $f$ the frequency of transmitted current, $I$ the current in the winding of the coil and $P_c$ and $P_w$ are the packing factors (ratio of active material to total space available) in the core and the winding respectively, then the inductance $L$, and the ratios thereto of the direct current resistance $R_o$, of the eddy current resistance $R_e$ and of the hysteresis resistance $R_n$ are given by the following formulae:—

$$L=\frac{\Pi^2 n^2 d^2 \mu}{l}p_c 10^{-9} \quad (1)$$

$$\frac{R_o}{L}=6.4\times 10^2 \frac{D+d}{\mu d^2(D-d)}\frac{1}{p_w p_c} \quad (2)$$

$$\frac{R_e}{L}=\frac{4\Pi^3 \mu f^2 t^2}{8\rho} \quad (3)$$

$$\frac{R_n}{L}=47.5\frac{\lambda \mu f n}{l}I \quad (4)$$

Assuming that a material is used which has a very low value of $\lambda$, the hysteresis resistance will usually be small compared to $R_o$ and $R_e$ in a well designed coil at all points in the cable except near the ends, where $I$ is large. In the central part of the cable the coil will be designed so that for a value of D which is considered to be the largest permissible coil diameter from a mechanical standpoint, $R_o + R_e$ will be a minimum. Given values of $t$, $f$ and $\rho$ the best values of $d$ and $\mu$ may be determined and will determine the composition and heat treatment of the magnetic material. Towards the ends of the cable $l$ becomes large and with it $R_n$. The components $$\frac{R_o}{L} \text{ and } \frac{R_e}{L}$$

are independent of the length of the coil.

$$\frac{R_n}{L}$$

is inversely proportional to $l$; consequently this relation represents one means of keeping $$\frac{R_n}{L}$$

small. It follows from this that in the center of the cable much shorter coils may be used than toward the terminal sections.

One example of practical application of the present invention will now be described in conjunction with the accompanying drawing, in which:

Fig. 1 represents a diagrammatic view of a submarine cable system embodying loading coils in accordance with this invention;

Fig. 2 represents partly a longitudinal section through a loading coil of the type which may be used in a system such as shown in Fig. 1;

Fig. 3 represents a transverse section along line 3—3 of Fig. 2; and

Fig. 4 represents an enlarged and detailed view of the magnetic core of a coil such as is shown in Fig. 3.

Fig. 1 shows schematically loading coils of the type shown in detail in Fig. 2 but of varying lengths. In the submarine cable 10 there are inserted loading coils 11 and 12. The lengths of the coils at various points along the cable will be determined in practice by the inductance necessary or desired and the ratio thereto of the hysteresis resistance $R_n$, found by means of the above derived formulæ when applied to a specific case.

In a typical practical example of application the coils 11 inserted in the terminal sections of a submarine cable of about 1000 miles length may have a length of about 20 feet while the coils 12 inserted in the central sections have lengths of about 2 feet. Thus, the reluctance of the magnetic return path through that part of the armor wires which surrounds the loading coils is large compared with that of the path through the sea water and thus the aforementioned energy losses in the armor wires are considerably reduced, while this is particularly true of the long loading coils, it also applies to the shorter coils.

Fig. 2 shows details of the construction of the coils used in Fig. 1. The coil comprises an elongated core of long straight wires 15 of about 0.014″ (0.355 millimeters) of a magnetic material having high initial permeability, high resistivity and low hysteresis loss. Although any magnetic material possessing these properties may be used, a material which is particularly suitable has been described in U. S. Patent 1,715,647, granted June 4, 1929 to G. W. Elmen. The values of resistivity and permeability desired will determine the composition and heat treatment of the magnetic material. By way of example, a permeability of 1200 and a resistivity of 80 microhm-centimeters can be obtained with a composition comprising about 47% nickel, 20% iron, 25% cobalt and 8% molybdenum with a heat treatment consisting of a pot anneal of about one hour at about 1000° C. The wires 15 are insulated from each other, for instance, by individually oxidizing their surface before assembly, as shown at 16 in Fig. 4.

Upon the core wires 15 is spirally wound the coil winding 17 which is spliced to the cable conductor 18. The cable insulation is extended over the core of the loading coil as shown at 19. The insulating material used should preferably have a low dielectric constant and low leakance such, for example, as a material of the nature described in U. S. patent application Serial No. 215,235, filed August 24, 1927. The insulating material 19 is surrounded by a layer of jute 20 to serve as a proper base for the protective steel tape 21. Preferably this steel tape 21 is rendered flexible by using steel of high resiliency or spring steel. The steel tape 21 is in turn surrounded by a layer of jute 22 which serves as a bedding for the armor wires 23. In order to provide for a uniform spacing of the armor wires where they cover the loading coil and steel, they are spaced by filler material shown at 24 in Fig. 3. Jute or a cheap grade of rubber is suitable for this purpose. A jute tape 25 is wound around the spacing material and armor wires to keep the spacing material in position and to make a compact structure.

An alternative method of keeping the ratio of hysteresis resistance to inductance small would be to use for the coils in the terminal sections a material which has a very low magnetic stability, that is, a high constancy of permeability, but which is not suitable for use throughout the cable on account of unsatisfactory values of initial permeability and resistivity. In this embodiment of the invention, a magnetic core material could be used having substantially the same composition as the one described above, except for the presence of molybdenum, but having received a heat treatment to develop an initial permeability of about 600.

What is claimed is:

1. A deep sea signaling cable comprising an armor and a plurality of loading coils within said armor, said coils having elongated cores of magnetic material for lump loading said cable and being arranged in at least two groups of which one is located adjacent the ends of the cable and the other is located more remote from the ends of the cable, the coils contained in the first mentioned group being different from those contained in the last mentioned group in that they have longer cores, lower hysteresis losses and lower ohmic or pure resistance losses.

2. Cable as defined in claim 1, characterized in that the ratio of the length of the coils inserted in the terminal sections to the length of the coils inserted in the central sections is of the order of about ten, whereby the reluctance of the magnetic return path through that part of the cable armor which surrounds the loading coils is large compared with that of the path through the sea water and energy losses in the armor wires are reduced.

3. A deep sea signaling cable comprising a plurality of inductance devices having elongated cores of magnetic material for lump loading said cable, characterized in that the cores of the devices used in the terminal sections are made of material having a high constancy of permeability and that the cores of the devices inserted in the central sections have low values of initial permeability and resistivity.

4. An elongated submarine cable loading coil characterized in that it comprises an armor and an envelope constituted by a flexible metallic tape spiraled around the loading coil.

5. A submarine cable loading coil as defined in claim 4 further characterized in this that the armor wires surrounding the loading coil are spaced by spacing material such as jute.

6. Cable in accordance with claim 1, further characterized in this that the loading coils more remote from the ends of the cable have low resistive and eddy current losses.

In witness whereof, I hereunto subscribe my name this 13th day of August, 1930.

JOHN J. GILBERT.